United States Patent Office 2,817,135
Patented Dec. 24, 1957

2,817,135

PANEL FASTENERS

William H. Harris, Litchfield, and Ernest Heyworth, New Haven, Conn., assignors to Scovill Manufacturing Company, Waterbury, Conn., a corporation of Connecticut Application July 8, 1954, Serial No. 442,154

8 Claims. (Cl. 24—221)

This invention relates to fasteners which are unyielding as in the case of a common bolt and nut and at the same time which can be quickly connected or disconnected.

Rotary operative and quick releasable panel or cowl fasteners are in common use in airplanes for holding in place various parts of the cowl inspection covers, and other similar structures. Such fasteners in general have a socket member attached to a support or inner plate and a stud member attached to an outer panel or plate, and wherein the stud member has a quick attachable and releasable engagement with the socket member by a turning action of relatively few degrees. These fasteners are generally of the spring loaded or yielding type and have been found to be unsatisfactory in modern high speed aircraft because they will allow lateral movement between the plates and also partial separation of the sheets which they are intended to hold together.

The general object of our invention is to solve the above and to make a fastener which is capable of carrying primary structural loads and other problems which are encountered in fasteners of this type.

When the hole in the inner plate is substantially larger than the stud diameter, a fastener is weak in shear because under a shear load the stud tends to angle over to one side or the other. The problem is solved in our construction by the use of a shear washer fitted about the stud and filling the plate hole.

Another problem comes about because of varying thicknesses of sheets or plates, or because the plates are somewhat separated due to going around curves, or other reasons, so that some provision must be made for adjustability between the stud and female fastening members. This is accomplished in older type fasteners by a spring action in at least one of the parts and by the use of a wide variety of stud lengths which necessitates carrying a large inventory.

According to our invention the female portion of the fastener includes a hollow screw threaded socket having internal means with which the stud may be engaged or disengaged by a quarter turn movement. This screw socket is threaded into a nut housing which is carried by the inner plate, preferably in a manner to allow for some lateral floating movement.

The usual manner of engagement of a stud with a socket requires the lateral wings or pins on the stud to cam over projections on the socket member and to drop into adjacent recesses. In our improved construction the stud wings are engaged over flat surfaces of the socket, and novel means is provided above the wings to prevent unintended turning of the stud in the socket, which novel means also serves to eject the stud from the socket when the stud is turned to unfastened position.

Another problem encountered with fasteners of this type is the retention of the stud member in the outer plate when the plates are separated, especially when the plates are handled in a careless manner, as by being walked upon or run over by shop jitneys. Our invention solves this problem by employing a shear washer which fits into a hole in the inner plate when the plates are assembled, and thus creates a greater bearing surface between the stud and inner plate, in combination with a locking ring fitted in a groove in the stud and which ring moves into a recess in said shear washer when there is any force applied to the stud tending to push it out through the outer plate. This shear washer is prevented from moving inwardly through the inner plate by means of an overhanging part of the base plate of the female fastener part, which base plate also serves as a limiting factor to limit the outward threading movement of the screw socket relative to its housing.

In our improved fastener, if the sheets are slightly separated, the stud member may be engaged with the screw socket to back off the screw socket to the point where the stud may enter to its proper position. Thereafter the stud can be turned to the right to interengage the stud and socket. After the first quarter turn the wings or projections on the stud engage stops in the screw socket to transmit turning movement to the screw socket so as to pull the plates tightly together. This combination assures a wide range of adjustments for the socket relative to the nut housing with any one stud length, thus simplifying the inventory problem.

If the stud is not projected sufficiently into the socket and it is attempted to turn the stud to the right, our invention provides another important feature which serves to cam the stud outwardly and visibly indicates to the mechanic that the stud is not properly engaged.

With these and other objects in view, the invention will be readily understood from the following detailed description of one preferred embodiment shown in the accompanying drawing wherein:

Fig. 1 is a plan view of the female member embodying our invention.

Fig. 2 is a vertical sectional view of the assembled female and stud members, the view taken along the line 2—2 of Fig. 1.

Fig. 3 is a similar view showing the stud as it appears lined up for assembly into the adjustable part of the female member.

Fig. 4 is a side elevation of the winged portion of the stud member.

Fig. 5 is an end view of the entrance end of the adjustable socket.

Fig. 6 is a fragmentary vertical sectional view through said socket taken along the line 6—6 of Fig. 5.

Fig. 7 is a transverse sectional view of said socket taken along the line 7—7 of Fig. 6, and Fig. 8 is a perspective view of the locking disc.

In considering now the details of construction, the fastener is adapted to rigidly clamp a removable outer plate or panel 10 to an inner support plate 11. The latter carries the female unit of the fastener, and the outer plate carries the stud unit. The stud unit consists of a stud 12, a shear washer 13 and a retaining split ring 14, the stud unit being rotatably mounted in an opening 15 in outer plate 10. The stud 12 itself is formed with a double diameter shank, the large portion 16 and the small portion 17 with a connecting conical shoulder 18 therebetween. One end of the large portion 16 is provided with a flat head 19 formed with a tool-engaging recess 19a that preferably is of the type used in the "Phillips head screws" of well known construction. The plate opening 15 is shaped to rotatably receive the large portion 16 of the stud shank and flat head 19 so that said head will lie flush with the outer surface of said plate 10. A circumferential recess 20 in the larger shank portion 16 of the stud 12 is adapted to receive the split ring 14 for holding the shear washer 13 in assembled position on said stud and in turn holding the stud in the outer plate 10, said Dec. 24, 1957　　　　H. P. ZARTLER　　　　2,817,136
HOSE CLAMP CONSTRUCTION
Filed Feb. 8, 1954　　　　　　　　　　　　2 Sheets-Sheet 2
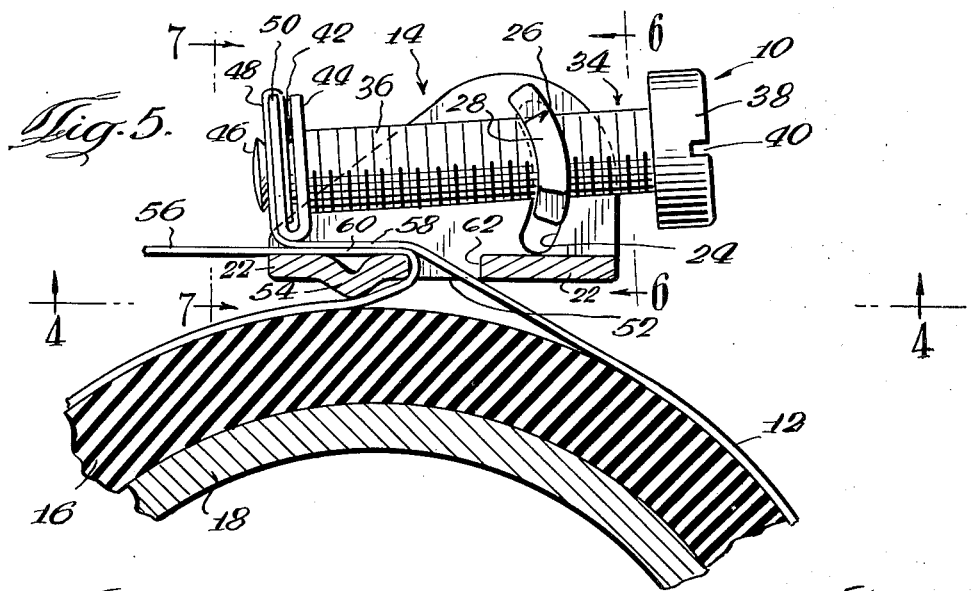
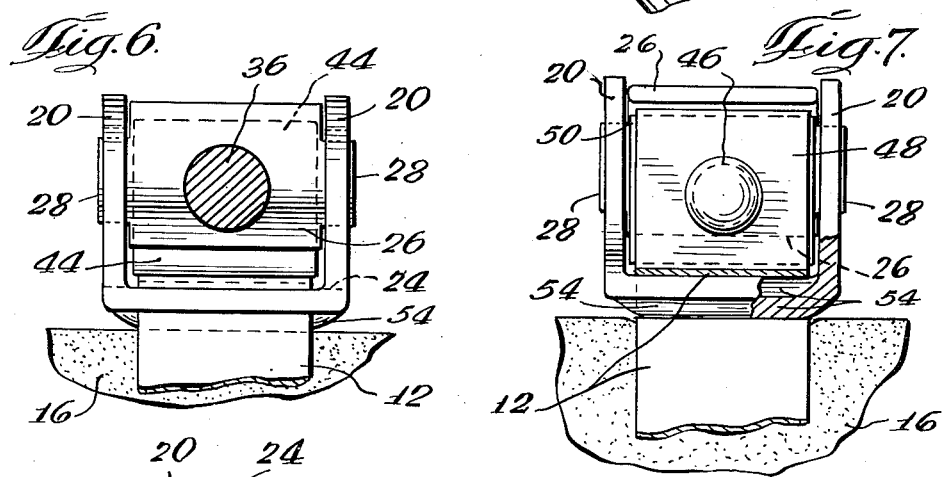
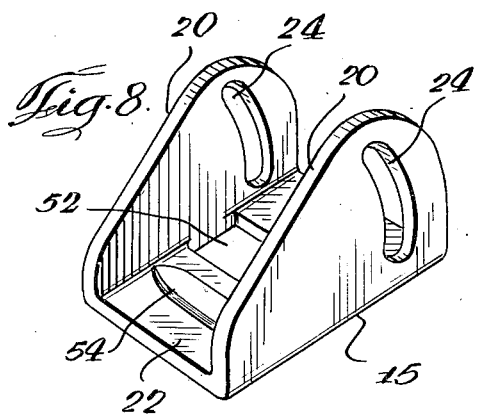
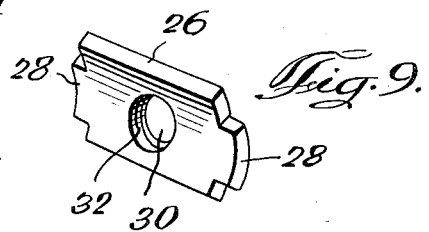
Inventor
Herbert P. Zartler
By Silverman + Muller
Attorneys

United States Patent Office 2,817,136
Patented Dec. 24, 1957

2,817,136

HOSE CLAMP CONSTRUCTION

Herbert P. Zartler, Chicago, Ill., assignor to Wittek Manufacturing Company, Chicago, Ill., a corporation of Illinois Application February 8, 1954, Serial No. 408,844

7 Claims. (Cl. 24—279)

This invention relates generally to clamping devices and more particularly to improvements in such devices which are adapted to clamp hoses and the like to tubular members such as pipes.

Hose clamp devices of the general character in which flexible straps or bands are secured at one end to a threaded bolt movably mounted within a frame and the other end is anchored in the frame by inserting it through a slot in the frame and then folding it back, are well known. In these clamps as the bolt is advanced for the purpose of drawing the band reversely about the hose and pipe to which the clamp is applied, the end of the band is moved into frictional relationship with the opposite end of the band, which has been folded back within the frame, and thereby locks the same in immovable relationship simultaneously with the tightening of the clamping band.

The advantages of this band-type clamp with its ready adjustment for clamping tubular objects within a wide range of sizes is generally recognized. However, heretofore the various clamp constructions have been attended by numerous disadvantages, many of which have not been eliminated by the several allegedly improved constructions which have been introduced from time to time.

Prominent among the above-mentioned disadvantages has been the tendency of the screw-threaded bolt to bind within the nut through which it is threaded as the tension force applied to the end of the bolt pivots the bolt away from a plane perpendicular to the plane of the nut. Another disadvantage inherent in previous constructions was the tendency of the hose to creep and be crimped by the band as it was tightened rather than merely being embraced and compressed. Obviously, the crimping action weakened the hose and in some cases caused objectionable leakage. Still other disadvantages of prior devices arose in that it was necessary to employ relatively large cumbersome frames and heavy nuts and bolts in order to achieve the necessary clamping and tightening operations. This, of course, resulted in increased material, labor and die costs as well as increased weight especially objectionable in aircraft.

It is therefore the principal object of this invention to provide a hose clamp whose purpose it is to clamp and seal a hose to a tubular pipe or the like, the said clamp having a novel and improved construction whereby the same overcomes the disadvantages referred to hereinabove.

Still another object of this invention is to afford a hose clamp in which the tightening or clamping operation may be achieved with minimum effort and with minimum interference from the mechanical arrangement of the component parts of the device.

Still a further object is to provide a hose clamp in which, without increasing the over-all size and weight of the nut member, such a member is afforded in which the number of bolt screw threads engaged by those of the nut far exceed that heretofore engageable in clamps of this type. An object relating thereto is to afford a clamp in which greater force may be applied in tightening the clamp without risking the possibility of stripping the threads of the nut.

Among other objects is the provision of a hose clamp in which maximum frictional relationship is achieved between the fixed end of the band and the free end of the band without materially affecting the ease of operation; and to provide an improved means for affixing the end of the band to the bolt.

In accordance with the invention there is provided a hose clamp in which the bolt is threaded through an arcuate shaped nut which in turn is mounted in arcuate slots formed in the sides of the frame or saddle of the device. The nut is movable to a limited degree within the arcuate slot but sufficiently to compensate for the tendency of the bolt to be pivoted out of the proper plane with the nut, thereby preventing binding of these two members. The saddle member is further provided with a strategically positioned detent adapted to prevent crimping or twisting of the hose during the clamping operation and further adapted to serve as a fulcrum or pivot point about which the tensioning member may be moved in order to insure the application of force in the most effective direction.

As the description of the invention proceeds hereinafter, it will become apparent to the skilled artisan that there has been devised a hose clamp for the purposes described which has advantages and salutary objects in addition to those suggested hereinabove. It will also become apparent that many variations and changes are possible without departing from the scope or varying from the spirit of the invention, and with this in mind, the specific description of the preferred embodiment which follows, and which is required by the statutes, is only intended by way of illustration and clarification and not by way of limitation.

In the drawings in which like characters are used to designate the same or similar parts throughout the several figures of the drawings, and in which a preferred embodiment is illustrated in some detail:

Fig. 1 is a side elevational view of a hose clamp constructed in accordance with the present invention, mounted in operational position on a section of a hose and pipe assembly;

Fig. 2 is a fragmentary top plan view of the tensioning member of the hose clamp;

Fig. 3 is a side elevational view partially in section taken on a plane inside of the wall of the bracket member and showing the device in its inoperative condition;

Fig. 4 is a bottom plan view of the tensioning member taken on the plane of line 4—4 in Fig. 5 of the drawings and viewed in the direction indicated;

Fig. 5 is an elevational sectional view, as taken on the plane of line 5—5 in Fig. 2 of the drawings, similar to Fig. 3 but illustrating the clamp in operational position on a fragment of a hose and pipe assembly;

Fig. 6 is a fragmentary sectional view taken on the plane of line 6—6 of the drawings and viewed in the direction indicated;

Fig. 7 is a fragmentary sectional view taken on the plane of line 7—7 in Fig. 5 of the drawings viewing the tensioning member from the end opposite to that viewed from Fig. 6;

Fig. 8 is a perspective view of the bracket or saddle member of the clamp; and

Fig. 9 is a perspective view of the nut member of the clamp.

Referring to the particular construction illustrated herein, the reference numeral 10 is used to designate generally the entire device while 12 represents the flexible strap or band and 14, the tensioning unit. The band 12 may comprise a thin strip of flexible material, preferably somewhat resilient such as steel. In operational position it is mounted to encircle a hose 16 which in turn is mounted on a tubular member such as a pipe 18, the function of the strap 12 being to clamp the marginal end portion of the hose 16 to the marginal end portion of the pipe 18.

The clamping or tensioning member 14 comprises a bracket or saddle 15 having vertical side walls such as 20 with an integrally formed bottom wall 22. Each of the side walls 20 may be non-uniform in height sloping downwardly from the rear to the front of the bracket. The bracket may be open at both ends. In the rear or highest portion of each of the walls, an arcuate slot such as 24 may be formed therethrough.

Within the above-mentioned side-wall slots 24 may be mounted in swivel or movable relationship an arcuate-shaped nut 26. The nut 26 is formed with outwardly protruding tongues such as 28 which are adapted to slidingly fit within the slots 24. It will be noted that the height of the tongues 28 is considerably less than the height of the slot so that the nut is movable in both directions in a path defined by the curvature of the arcuate slots. The nut 26 is centrally apertured as at 30, and the walls thereof screw-threaded as at 32.

Threaded through the aperture 30 is a tensioning bolt 34 comprising a screw-threaded shank 36 and a head 38. The head may be centrally slotted as at 40. The opposite extremity of the bolt 34 is formed with a shank portion 42 of reduced diameter upon which may be mounted a U-shaped retaining member 44 which is adapted to cooperate with a headed or peened-over shank end portion 46 to retain and affix thereto a captured end portion 48 of the strap 12. It will be noted that the strap end portion 48 is wrapped around the outermost leg 50 of the retaining member 44 and secured in place by the headed shank end 46. The outermost end abuts the reduced diameter shank portion 42 and is thereby further secured in position. The above-described structure affords a means for yieldably but securely affixing the end 48 of the strap 12 to the tightening member, namely the bolt 34, in such a manner that it does not interfere with the rotation thereof.

Referring now to Figs. 3, 4, 5, and 8 of the drawings in which the bottom wall 22 of the bracket is illustrated, it will be noted that the same is formed with a laterally extending slot 52 positioned approximately midway of the length thereof. The front portion of the bottom wall may be formed with a laterally extending crimp or detent 54 depending from the bottom wall 22 as shown in Figs. 3 and 5 of the drawings. The function of this detent will be disclosed as the description proceeds.

It will be noted that the strap 12 is threaded through the slot 52 and wrapped about the hose and pipe assembly. The free end 56 is likewise threaded through the slot 52 and then bent back over the front portion of the bottom wall 22 so that the end protrudes from the bracket as shown in Figs. 1 and 5 of the drawings. After the clamp has been mounted on the hose and pipe assembly in the manner described hereinabove, the tensioning member 14 may then be operated to draw the band 12 tightly about the assembly and thereby effect the clamping function. To do this the bolt 34 is rotated in a direction whereby the threads of the shank 36 cooperating with the threads 32 of the nut 26 advance the captured end 48 of the band, thereby reversely tightening the band about the hose and pipe assembly. It will be noted that as the bolt moves forwardly, a portion 58 of the band advances over the free end portion 56, especially that segment 60 which is positioned above the front segment of the bottom wall 22. The reverse bend of the strip 12 through the slot 22 at this point acts to snub or prevent the movement of the strap, and this snubbing or braking action is further aided by the friction relationship existing between the two segments of the strap, namely 58 and 60. Moreover, as the strap is drawn taut, tension is applied to the outermost end of the bolt shank 36. The resultant force vector is directed downwardly thereby increasing the frictional relationship between the strap segments 58 and 60.

It will now be evident that as the bolt end is drawn downwardly, the opposite end of the bolt tends to swivel about its pivot in an upward direction which ordinarily would cause the bolt to bind within the nut 26. Obviously, this would ordinarily increase the work necessary to advance the bolt to the maximum clamping position. To prevent this objectionable binding, the movable mounting of the nut 26 within the brackets has been conceived. Thus, when the tension at the outermost extremity of the bolt has reached the stage where the bolt might begin to bind within the nut, the nut is moved within its arcuate path upwardly, an amount sufficient to prevent the binding of the screw-threads. However, this movement is limited by the dimensions of the slot so that excessive swiveling does not take place. Essentially, the movement is such that the nut constantly tends to adjust itself or seek the angular position which will offer the least resistance to the tightening operation but without adversely affecting the frictional relationship between the strap segments 58 and 60.

The construction of the bottom wall 22 with the detent or crimp 54 already has been described hereinabove. This construction serves a number of important functions which will now be noted. Firstly, the tension exerted on the outer extremity of the bolt 34 which tends to pull the end downwardly obviously tends also to pull the entire tensioning device downwardly including the bracket 15. Under such conditions the detent 54 acts as a fulcrum whereby the rear portion of the bracket is swiveled upwardly as the front portion is pulled downwardly. As this swiveling action takes place, the rear edge 62 of the wall of the slot 52 is raised sufficiently to permit the strap 12 to extend therethrough in a straight undented path. This, of course, reduces the frictional interference which would otherwise result from the denting of the strap 12 by the edge 62 at this point. In this manner the tightening operation is further freed from mechanical interference of the tightening device itself.

Another important function that is served by the detent 54 is to prevent the twisting or creeping of the hose 16 during the tightening operation. Although, theoretically the forces should be applied radially and evenly distributed to clamp the hose 16 to the pipe 18 by compression, practically there has been a tendency in most clamps used heretofore, for a certain amount of torsional force to be applied. This, of course, results in twisting or creeping of the hose which in turn weakens the hose considerably at the point of clamping. The present invention eliminates to a considerable extent this undesirable twisting tendency. Contributing to this desirable feature, in addition to the free and unimpeded movement of the strap 12 through the saddle or housing 15, is the tendency of the detent 54 to be pressed downwardly sufficiently to prevent twisting or torsional movement of both the strap and the hose at this particular point. As a consequence of the strap and hose being maintained in immovable position at this point, torsional movement is thereby to a large extent prevented. Finally, the crimping of the bottom wall 22 tends to strengthen the same at this point, thereby preventing deformation thereof.

Directing attention once more to the arcuate nut 26 and the bolt 34 threaded therethrough, it should be noted that the tightening or advancement of the bolt depends entirely upon the relationship between the bolt and the nut. It is of course a basic mechanical principle that the greater the cooperating screw-threaded area, the greater the force which may be applied in turning the bolt without endangering the threads of the nut. Of course, the nut could be made thicker and in this manner afford a greater number of threads for contacting the threads of the bolt. However, this is undesirable from the standpoint of weight, size and conservation of materials.

It will therefore be perceived by examining Fig. 5 of the drawings that by designing the nut 26 in arcuate shape, the number of cooperating threads are increased far beyond the number which would otherwise be present in a comparable flat or straight nut such as was heretofore utilized in such clamps.

From the foregoing description, it will be evident that the present invention provides a clamping device in which relatively great tension may be set up in a continuous band to insure leakproof clamping of a hose to a tubular object such as a pipe. Furthermore, frictional engagement between certain segments of the band assures positive gripping action. The tilting action of the bracket resulting from tensioning of the device, is sufficient to clear the back edge of the slot above the band 12 as it passes therethrough, whereby unimpeded movement may be achieved. Moreover, objectionable bends in the band at this point are eliminated. The movable association of the nut 26 with the bracket 15 provides a simple, but effective, means for preventing the occurrence of binding between the nut and the bolt; the nut moving within its limited arcuate path sufficiently to accommodate the tilting movement of the bolt resulting from the downwardly directed force vector applied at the outer extremity of the bolt. Finally, the detent 54 formed in the front portion of the bottom wall 22 affords a fulcrum about which the bracket may be swiveled to achieve the functions mentioned hereinabove as well as providing means for arresting or preventing the torsional creep which would otherwise be imparted to the hose 16 by the tensioning of the strap 12.

It is believed that the invention has been fully explained and illustrated with sufficient clarity to enable one skilled in the art to understand, practice, and construct the same, and it is again emphasized that the details are capable of variation without departing from the spirit or scope of the invention.

What is claimed by Letters Patent of the United States is:

1. In a hose clamp for clamping together a pair of tubular members in substantially leakproof relationship the combination comprising: a flexible steel band encircling the tubular members, a bracket having a pair of side walls and an integrally formed bottom wall, each of said side walls formed with elongated aligned arcuate slots, and said bottom wall formed with a transversely disposed medial slot, a nut mounted between said side walls with its ends loosely disposed in said arcuate slots, said nut having an internally-threaded central aperture formed therethrough, a tensioning bolt having a slotted head and a threaded shank disposed in cooperating relationship through the central aperture of said nut, both ends of said band threaded through said bottom-wall slot with one end secured to the end of said bolt and the other end bent back about the leading edge of the bottom-wall slot to afford a segment positioned on top of the front portion of said bottom-wall, said bolt rotatable to move a segment of said band adjacent the secured end into frictional bearing relationship with said first-mentioned segment.

2. The hose clamp of claim 1 in which said nut is arcuately curved in a plane defined by the surface of a cylinder having its major axis disposed in a horizontal plane perpendicular to said sidewalls.

3. The hose clamp of claim 1 in which said bottom wall is formed with a depending detent transversely disposed in front of the leading edge of said slot, said detent adapted to be pressed into the top one of said tubular members to prevent twisting thereof.

4. A hose clamp comprising a hose encircling metal strap having free ends, a bracket providing a pair of spaced vertical walls each having an elongate, vertically extending arcuate-shaped bearing aligned one with the other coextensively and a transversely slotted bottom wall connecting the vertical walls, tensioning means including a tightening bolt journalled in said bearings between the vertical walls and movable in a direction normal to the axis of the hose and an arcuate nut having a central aperture through which the bolt is passed and laterally extending trunnions each engaged in a said bearing, both ends of the strap being extended through said slot with one strap end secured to an end of the bolt and the other strap end extended forwardly of said bolt end, said bolt being movable to advance the secured strap end into snubbing engagement with the other strap tightening the clamp and also movable linearly along the arcuate path defined by the bearings during snubbing engagement of the strap ends to prevent binding of the bolt and nut one with the other.

5. A hose clamp as defined in claim 4 in which said bottom wall has fulcrum means on the underside thereof spaced forwardly of the leading edge of said slot in engagement with the hose about which said clamp will tilt during said snubbing engagement substantially to prevent distortion of the segment of the band adjacent the secured end by the trailing edge of the slot and said means will be pressed into the hose substantially to prevent torsional movement of the hose and strap thereat.

6. A hose clamp as defined in claim 4 in which said bottom wall has fulcrum means on the underside thereof spaced forwardly of the leading edge of said slot in engagement with the hose about which said clamp will tilt during said snubbing engagement substantially to prevent distortion of the segment of the band adjacent the secured end by the trailing edge of the slot and said means will be pressed into the hose substantially to prevent torsional movement of the hose and strap thereat, comprising a transversely extending depending ridge connected with said bottom wall.

7. A hose clamp as described in claim 4 in which the nut has a reduced dimension tongue integral with each side edge thereof providing said trunnions which are loosely received in the bearings, one strap end being rigidly secured to the end face of the bolt in a plane normal to the axis of the bolt, said bolt being movable to frictionally engage against a segment of the strap overlying the bottom wall forwardly spaced from the leading edge of said tranasverse slot.

References Cited in the file of this patent

UNITED STATES PATENTS

| | | |
|---|---|---|
| 1,357,821 | Peirce | Nov. 2, 1920 |
| 1,412,188 | Lopdell | Apr. 11, 1922 |
| 1,658,959 | Zifferer | Feb. 14, 1929 |
| 2,073,294 | Caillau | Mar. 9, 1937 |
| 2,218,481 | Prochaska | Oct. 15, 1940 |
| 2,381,349 | Hagen et al. | Aug. 7, 1945 |
| 2,466,755 | Webster et al. | Apr. 12, 1949 |

FOREIGN PATENTS

| | | |
|---|---|---|
| 49,311 | France | Nov. 12, 1938 |
| | (Add. to 789,138, corresponding with U. S. Patent 2,073,294) | |
| 610,474 | Great Britain | Oct. 15, 1948 |